United States Patent
Kaino et al.

(10) Patent No.: US 11,427,122 B2
(45) Date of Patent: Aug. 30, 2022

(54) HEADLIGHT CONTROL SYSTEM

(71) Applicant: Mazda Motor Corporation, Hiroshima (JP)

(72) Inventors: Akira Kaino, Aki-gun (JP); Kumiko Takenouchi, Aki-gun (JP); Yoshitaka Fujihara, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/353,850

(22) Filed: Jun. 22, 2021

(65) Prior Publication Data

US 2022/0001793 A1 Jan. 6, 2022

(30) Foreign Application Priority Data

Jul. 1, 2020 (JP) .............................. JP2020-113901

(51) Int. Cl.
*B60Q 1/14* (2006.01)
*F21S 41/141* (2018.01)
(Continued)

(52) U.S. Cl.
CPC ........... *B60Q 1/143* (2013.01); *B60Q 1/0023* (2013.01); *B60Q 1/2696* (2013.01);
(Continued)

(58) Field of Classification Search
CPC .............. B60Q 1/143; B60Q 2300/052; B60Q 2300/054; B60Q 2300/41; B60Q 2300/42;
(Continued)

(56) References Cited

U.S. PATENT DOCUMENTS

| | | | |
|---|---|---|---|
| 7,195,379 B2 * | 3/2007 | Shaffer | B60Q 1/085 362/465 |
| 2013/0006480 A1 * | 1/2013 | Osanai | B60Q 1/143 348/148 |

(Continued)

FOREIGN PATENT DOCUMENTS

| | | |
|---|---|---|
| JP | 2013-18433 A | 1/2013 |
| JP | 6287969 B2 | 3/2018 |

OTHER PUBLICATIONS

Schneider et al., Age-related study for determination of the 95%-detectability of objects under peripheral vision condition, Jun. 11-14, 2017, 2017 IEEE Intelligent Robot Symposium (IV), pp. 1552-1557 (Year: 2017).*

*Primary Examiner* — Keith G. Delahoussaye
(74) *Attorney, Agent, or Firm* — Xsensus LLP

(57) ABSTRACT

A headlight control system has a headlight including a plurality of LED light sources, a camera and a radar that detect a predetermined target object present ahead of a vehicle, and a controller configured to control the headlight such that, when the target object is present, of the plurality of LED light sources, the LED light source irradiating a region where the target object is present is turned off, and such that, thereafter, when the target object is no longer present in the region, the turned-off LED light source is turned on again. The controller controls the headlight such that, at the time of turning on the turned-off LED light source again, a change rate of luminance of the LED light source is changed according to a position of an irradiation region of the LED light source.

18 Claims, 8 Drawing Sheets

(51) Int. Cl.
*B60Q 1/00* (2006.01)
*B60Q 1/26* (2006.01)
*F21S 41/143* (2018.01)
*F21Y 115/10* (2016.01)
*F21W 102/135* (2018.01)
*F21W 102/20* (2018.01)

(52) U.S. Cl.
CPC ........... *F21S 41/141* (2018.01); *F21S 41/143* (2018.01); *B60Q 2300/052* (2013.01); *B60Q 2300/054* (2013.01); *B60Q 2300/23* (2013.01); *B60Q 2300/41* (2013.01); *B60Q 2300/42* (2013.01); *B60Q 2300/45* (2013.01); *F21W 2102/135* (2018.01); *F21W 2102/20* (2018.01); *F21Y 2115/10* (2016.08)

(58) Field of Classification Search
CPC .. B60Q 2300/45; F21S 41/141; F21S 41/143; F21S 41/147; F21W 2102/20
See application file for complete search history.

(56) References Cited

U.S. PATENT DOCUMENTS

2014/0145612 A1  5/2014  Takagaki
2020/0238892 A1* 7/2020  Maruyama ............... B60Q 1/12

* cited by examiner

HEADLIGHT CONTROL SYSTEM

CROSS-REFERENCE TO RELATED APPLICATION

This application claims priority to Japanese Patent Application No. 2020-113901 filed on Jul. 1, 2020, the entire disclosure of which is incorporated by reference herein.

TECHNICAL FIELD

The present disclosure relates to a headlight control system for controlling a headlight including a plurality of LED light sources.

BACKGROUND

A technique has been conventionally known in which, in the case where a predetermined target object such as a preceding vehicle or an oncoming vehicle is present ahead of an own vehicle, in order to suppress glare or the like which is applied to a driver of the other vehicle, a headlight is controlled such that a region where the target object is present is not irradiated (hereinafter, a region which is not partially irradiated with light of the headlight due to the presence of the target object is referred to as a "cut-off region" as appropriate). In this technique, when the target object is no longer present in the cut-off region due to, for example, movement of the own vehicle or the target object, the headlight is controlled such that the cut-off region is re-irradiated.

For example, Patent Literature 1 discloses a technique in which, when the target object is no longer present ahead of the vehicle and then the cut-off region (shield region) is re-irradiated, the headlight is controlled with an aspect in which the size of the cut-off region becomes gradually smaller. In addition, another technique relating to the present disclosure is disclosed in, for example, Patent Literature 2.

CITATION LIST

Patent Literature

[Patent Literature 1] Japanese Patent No. 5454523
[Patent Literature 2] Japanese Patent No. 6287969

SUMMARY

In the technique disclosed in Patent Literature 1, at the time of re-irradiation of the cut-off region, the cut-off region is immediately irradiated with light with the same luminance as a region other than the cut-off region (that is, a region already irradiated). Accordingly, the cut-off region which has not been irradiated with light and thus has been dark suddenly becomes brighter, so that a load (driving load) due to glare, blinking, or the like is applied to the driver. Furthermore, attention is directed to the cut-off region which has suddenly become brighter and attention is less likely to be directed to other regions, that is, an imbalance occurs in an attention allocation of the driver with respect to the front region.

In order to suppress the load on the driver or the imbalance in the attention allocation as described above, it is considered to gradually change the luminance of the light with which the cut-off region is re-irradiated. However, if the change rate (change speed) of the luminance of the light for re-irradiation is made too small, viewability of the cut-off region is not secured quickly and thus safety is not secured. On the other hand, if the change rate (change speed) of the luminance of the light for re-irradiation is made too large, the load on the driver or the imbalance in the attention allocation increases.

Meanwhile, humans have visual characteristics in which the light sensitivity, which is the sensitivity of the eye with respect to the brightness of light, varies depending on a position in the visual field space (in other words, a viewing angle). This is because the density of the rod cells on the retina which respond to the intensity of light varies according to the retinal eccentricity (an angle from the central depression of the eye). Accordingly, the present application considers such characteristics of human light sensitivity and considers that, at the time of re-irradiation of the cut-off region, if the change rate of the luminance of the light for re-irradiation is changed according to the position of the cut-off region, it may be possible to achieve both suppression of the load on the driver or the imbalance in the attention allocation and securing of safety by quick re-irradiation of the cut-off region.

The present disclosure has been made to solve the above-described problems and has an object to provide a headlight control system that can appropriately achieve, at the time of re-irradiation of a cut-off region, both suppression of a load on a driver or an imbalance in an attention allocation and securing of safety by quick re-irradiation of the cut-off region.

To achieve the object, the present disclosure is a headlight control system including a headlight including a plurality of LED light sources that irradiate a plurality of regions ahead of a vehicle; a target object detection device that detects a predetermined target object present ahead of the vehicle; and a controller configured to control the headlight such that, when it is detected by the target object detection device that the target object is present, of the plurality of LED light sources of the headlight, an LED light source irradiating a region where the target object is present is turned off, and such that, thereafter, when it is detected by the target object detection device that the target object is not present in the region, the turned-off LED light source is turned on, and characterized in that the controller is configured to control the headlight such that, when it is detected by the target object detection device that the target object is not present and the turned-off LED light source is turned on, a change rate of luminance of the LED light source is changed according to a position of an irradiation region of the LED light source.

According to the present disclosure configured as above, in consideration of human visual characteristics in which the light sensitivity varies depending on a position in the visual field space (viewing angle), the controller controls the headlight such that, at the time of re-irradiation of a cut-off region, according to the position of the irradiation region of the turned-off LED light source (corresponding to the position of the cut-off region to be re-irradiated), the change rate of the luminance when this turned-off LED light source is turned on is varied. Thus, at the time of re-irradiation of the cut-off region included in the region where the light sensitivity is low, the change rate of the luminance of the turned-off LED light source is relatively increased, so that it is possible to secure safety by quick re-irradiation of the cut-off region. Furthermore, at the time of re-irradiation of the cut-off region included in the region where the light sensitivity is high, the change rate of the luminance of the turned-off LED light source is relatively reduced, so that it is possible to suppress a load on a driver or an imbalance in an attention allocation. Therefore, according to the present disclosure, at the time of re-irradiation of the cut-off region, it is possible to appropriately achieve both suppression of the load on the driver or the imbalance in the attention allocation and securing of safety by quick re-irradiation of the cut-off region.

The above case "when it is detected by the target object detection device that the target object is not present in the region" includes not only the case where an absence of the target object in the region is detected by the target object detection device but also the case where the target object is not detected in the region by the target object detection device.

In the present disclosure, the controller can be configured to control the headlight such that, when the position of the irradiation region of the LED light source is included in a center region of a visual field of a driver or in a first region corresponding to a vicinity region outside of the center region, the luminance of the LED light source is changed at a smaller change rate than when the position of the irradiation region of the LED light source is included in a second region outside of the first region.

According to the present disclosure configured as above, the first region has a relatively high light sensitivity, so that, at the time of re-irradiation of the cut-off region included in the first region, the controller relatively reduces the change rate of the luminance of the turned-off LED light source. Thus, in the first region, it is possible to reliably suppress the load on the driver or the imbalance in the attention allocation. On the other hand, the second region has a relatively low light sensitivity, so that, at the time of re-irradiation of the cut-off region included in the second region, the controller relatively increases the change rate of the luminance of the turned-off LED light source. Thus, in the second region, it is possible to reliably secure safety by quick re-irradiation of the cut-off region.

In the present disclosure, the first region can include a third region located on an inner side in the region and a fourth region located outside of the third region, and the controller is configured to control the headlight such that, when the position of the irradiation region of the LED light source is included in the fourth region, the luminance of the LED light source is changed at a smaller change rate than when the position of the irradiation region of the LED light source is included in the third region.

According to the present disclosure configured as above, the fourth region located on an outer side in the first region has a higher light sensitivity than the third region located on the inner side in the first region, so that, at the time of re-irradiation of the cut-off region included in the fourth region, the controller reduces the change rate of the luminance of the turned-off LED light source as compared with the time of re-irradiation of the cut-off region included in the third region. Thus, in the fourth region, it is possible to effectively suppress the load on the driver or the imbalance in the attention allocation.

In the present disclosure, the controller can be configured to set the change rate of the luminance of the LED light source based on the Weber-Fechner law.

According to the present disclosure configured as above, at the time of re-irradiation of the cut-off region, the luminance of the LED light source is changed such that, based on the Weber-Fechner law, the change in the luminance perceived by a human becomes constant, that is, the quantity of human sensation with respect to the luminance changes in a constant manner. Thus, it is possible to effectively suppress the load on the driver and the imbalance in the attention allocation.

In an example of the present disclosure, the controller controls the headlight such that, between 0.2 seconds and 0.6 seconds, the luminance of the turned-off LED light source is changed and turning-on of the LED light source is completed.

According to the headlight control system of the present disclosure, at the time of re-irradiation of the cut-off region, it is possible to appropriately achieve both suppression of the load on the driver or the imbalance in the attention allocation and securing of safety by quick re-irradiation of the cut-off region.

DETAILED DESCRIPTION

Hereinafter, a headlight control system according to an embodiment of the present disclosure will be described with reference to the attached drawings.

[System Configuration]

Figure 1:
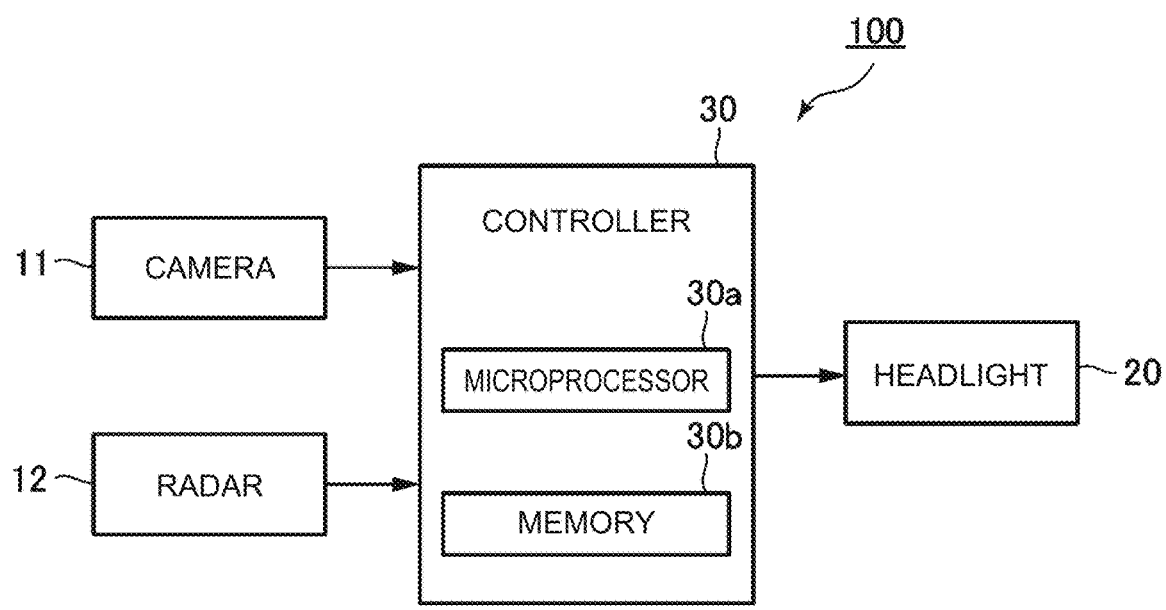
FIG. 1 is a block diagram illustrating a schematic configuration of a headlight control system according to an embodiment of the present disclosure.
Figure 2:
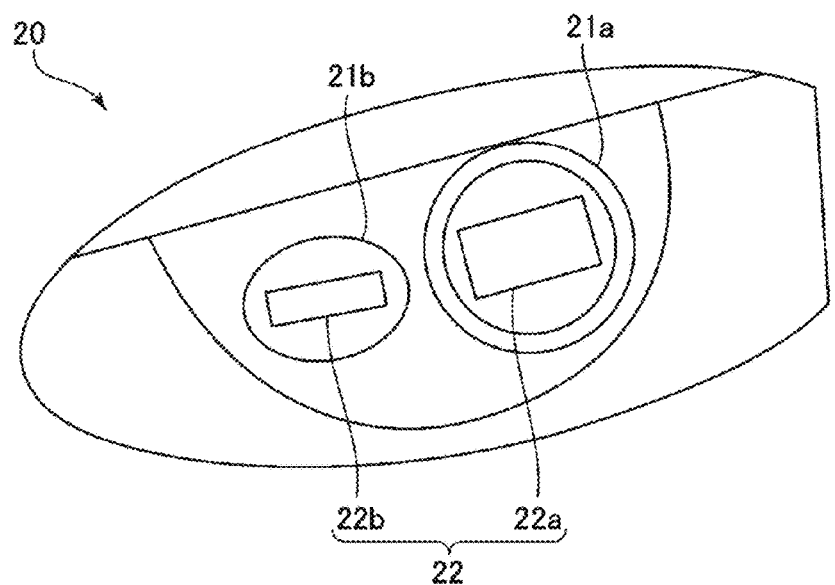
FIG. 2 is a schematic configuration view of a headlight according to the embodiment of the present disclosure.
Figure 3:
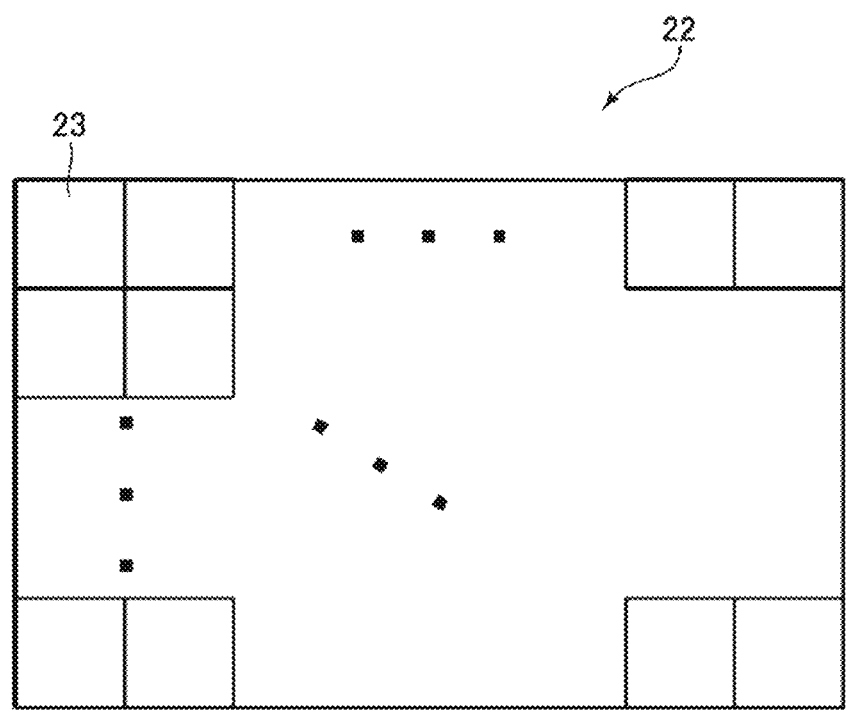
FIG. 3 is a schematic configuration view of LED light sources of the headlight according to the embodiment of the present disclosure.

A configuration of the headlight control system according to the embodiment of the present disclosure will be described with reference to FIGS. 1 to 3. FIG. 1 is a block diagram illustrating a schematic configuration of the headlight control system according to the embodiment of the present disclosure. FIG. 2 is a schematic configuration view of a headlight according to the embodiment of the present disclosure. FIG. 3 is a schematic configuration view of LED light sources of the headlight according to the embodiment of the present disclosure.

As illustrated in FIG. 1, a headlight control system 100 has a camera 11 and a radar 12 that function as a target object detection device that detects a predetermined target object (such as a preceding vehicle or an oncoming vehicle) present ahead of a vehicle, a headlight 20 that irradiates the front of the vehicle, and a controller 30 that outputs a signal for controlling the headlight 20 based on signals input from the camera 11 and the radar 12.

The camera 11 mainly photographs the front of the vehicle and outputs image data. The controller 30 specifies a type, position (relative position), and the like of the target object present ahead of the vehicle, based on the image data received from the camera 11. The controller 30 may acquire information on the target object from the outside by means of transportation infrastructure, inter-vehicle communication, and the like.

The radar 12 measures a position and speed of the target object present ahead of the vehicle. As the radar 12, for example, a millimeter wave radar can be used. The radar 12 transmits a radio wave in the moving direction of the vehicle and receives a reflection wave caused by the transmission wave being reflected by the target object. Then, the radar 12, based on the transmission wave and the reception wave, measures a distance between the vehicle and the target object and a relative speed of the target object with respect to the vehicle. Instead of the radar 12, a laser radar, an ultrasonic sensor, or the like may be used to measure the distance to the target object and the relative speed. Furthermore, a plurality of sensors may be used to configure a position and speed measurement device.

The headlights 20 are used in a left-right pair and provided on the left and right sides of a front portion of the vehicle. As illustrated in FIG. 2, the headlight 20 has a low beam unit 21a and a high beam unit 21b. The low beam unit 21a emits a low beam directed slightly downward of the front of the vehicle. The low beam forms, of the light emitted by the headlight 20, light at a portion on the vehicle vicinity side. The high beam unit 21b emits a high beam directed substantially in the horizontal direction toward the vehicle front side. The high beam forms, of the light emitted by the headlight 20, light at a portion on the vehicle far side.

The low beam unit 21a has an LED array 22a that emits the low beam, and the high beam unit 21b has an LED array 22b that emits the high beam (hereinafter, in the case where the LED arrays 22a and 22b are not distinguished, each of them is referred to as an "LED array 22"). As illustrated in FIG. 3, the LED array 22 is formed such that a plurality of LED light sources 23 arranged in the up-down direction are arranged in a plurality of rows in the lateral direction (vehicle width direction). Each of the LED light sources 23 is configured such that the luminance can be adjusted independently.

The number of rows of the LED light sources 23 is not particularly limited. Furthermore, if there are two or more LED light sources 23, the number of the LED light sources 23 for each row is not particularly limited. In particular, the number of the LED light sources 23 may be different for each row. Furthermore, the arrangement of the LED light sources 23 of the LED array 22a of the low beam unit 21a and the arrangement of the LED light sources 23 of the LED array 22b of the high beam unit 21b may be the same or may be different.

The controller 30 is composed of a circuit and is a controller based on a well-known microcomputer. As illustrated in FIG. 1, the controller 30 includes one or more microprocessors 30a as a central processing unit (CPU) for executing programs, a memory 30b composed of, for example, a random-access memory (RAM) or a read-only memory (ROM) for storing the programs and data, an input-output bus for inputting and outputting electrical signals, and the like. For example, the controller 30 is composed of an electronic control unit (ECU), and the like.

In the present embodiment, the controller 30 determines a presence or absence of the predetermined target object ahead of the vehicle based on the signals input from the camera 11 and the radar 12 and, according to the determination result, outputs the signal for controlling the headlight 20. The predetermined target object is an object which is not irradiated with the light of the headlight 20 and is present ahead of the vehicle, for example, a preceding vehicle or an oncoming vehicle.

[Contents of Control]

Hereinafter, contents of control of the headlight 20 by the controller 30 in the embodiment of the present disclosure will be described.

Figure 4:
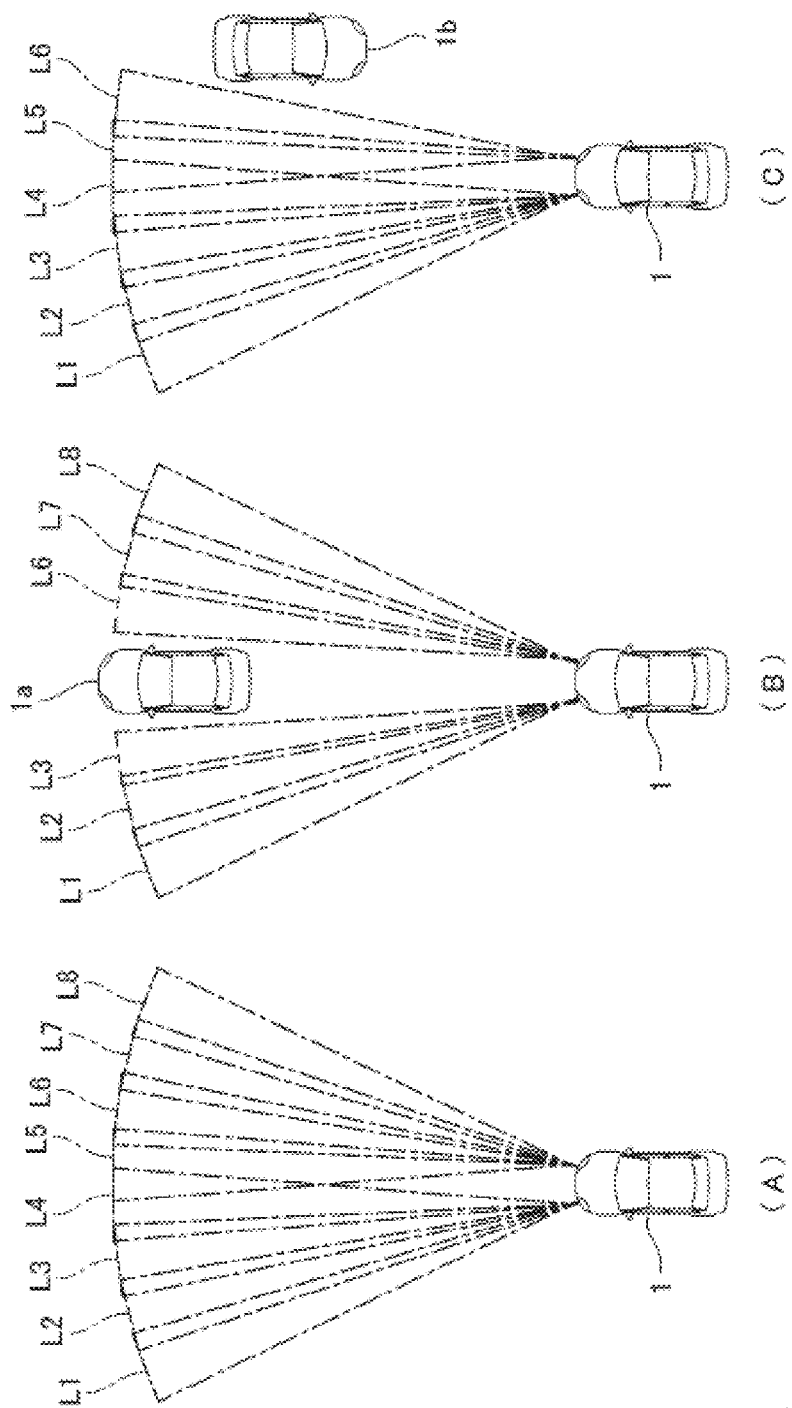
FIG. 4 is a view for describing basic control of the headlight according to the embodiment of the present disclosure.

First, basic control of the headlight 20 in the embodiment of the present disclosure will be described with reference to FIG. 4. FIGS. 4(A) to (C) are schematic views illustrating specific examples of irradiation patterns of the headlight 20 of the vehicle 1 (hereinafter referred to as an "own vehicle 1" as appropriate). Specifically, FIGS. 4(A) to (C) are views when irradiation ranges (represented by the one-dot chain lines) of the plurality of LED light sources 23 of the high beam unit 21b are seen from the top.

As illustrated in FIG. 4(A), when the target object (such as a preceding vehicle or an oncoming vehicle) is not present ahead of the own vehicle 1, the controller 30 turns on the plurality of LED light sources 23 (typically, all of the LED light sources 23) of the high beam unit 21b such that the front of the own vehicle 1 is irradiated thoroughly. In this case, for example, the irradiation ranges as indicated by reference characters L1 to L8 are formed by the plurality of LED light sources 23 of the high beam unit 21b.

On the other hand, as illustrated in FIG. 4(B), when a preceding vehicle 1a is present ahead of the own vehicle 1, the controller 30 turns off, of the plurality of LED light sources 23 of the high beam unit 21b, the LED light sources 23 irradiating a region where the preceding vehicle 1a is present. Specifically, the controller 30 turns off the LED light sources 23 irradiating irradiation ranges L4 and L5 where the preceding vehicle 1a is included (see FIG. 4(A)). Thus, without forming the irradiation ranges L4 and L5, only irradiation ranges L1 to L3 and L6 to L8 are formed by the plurality of LED light sources 23 of the high beam unit 21b. In this case, a region corresponding to the irradiation ranges L4 and L5 is the cut-off region.

Furthermore, as illustrated in FIG. 4(C), when an oncoming vehicle 1b is present ahead of the own vehicle 1, the controller 30 turns off, of the plurality of LED light sources 23 of the high beam unit 21b, the LED light sources 23 irradiating a region where the oncoming vehicle 1b is present. Specifically, the controller 30 turns off the LED light sources 23 irradiating the irradiation ranges L7 and L8 where the oncoming vehicle 1b is included (see FIG. 4(A)). Thus, without forming the irradiation ranges L7 and L8, only the irradiation ranges L1 to L6 are formed by the plurality of LED light sources 23 of the high beam unit 21b. In this case, a region corresponding to the irradiation ranges L7 and L8 is the cut-off region.

Next, after the controller 30 turns off the LED light sources 23 irradiating the region where the target object (such as the preceding vehicle 1a or the oncoming vehicle 1b) is present as described above, when the target object is no longer present in the region (corresponding to the cut-off region) due to, for example, movement of the own vehicle 1 or the target object, the controller 30 turns on the turned-off LED light sources 23 again. That is, the controller 30 re-irradiates a section of the cut-off region where the target object is no longer present. In this case, as described above, at the time of re-irradiation of the cut-off region, if the cut-off region is immediately irradiated with light with the same luminance as a region other than the cut-off region (that is, a region already irradiated), a load is applied to a driver or an imbalance in an attention allocation occurs. That is, if the turned-off LED light sources 23 are turned on again by changing the luminance of the turned-off LED light sources 23 in a step-like manner, the cut-off region which has been dark suddenly becomes brighter, so that a load (driving load) due to glare, blinking, or the like is applied to the driver. Furthermore, attention is directed to the cut-off region which has suddenly become brighter and attention is less likely to be directed to other regions.

In order to suppress the load on the driver or the imbalance in the attention allocation as described above, it is considered to, at the time of re-irradiation of the cut-off region, gradually change the luminance of the turned-off LED light source 23 corresponding to the cut-off region. However, if a change rate (change speed) of the luminance of the turned-off LED light source 23 is made too small, viewability of the cut-off region is not secured quickly and thus safety is not secured. In contrast, if the change rate (change speed) of the luminance of the turned-off LED light source 23 is made too large, the load on the driver or the imbalance in the attention allocation increases. Accordingly, in order to achieve both suppression of the load on the driver or the imbalance in the attention allocation and securing of safety by quick re-irradiation of the cut-off region, the present application considers human visual characteristics in which the sensitivity of the eye (light sensitivity) with respect to the brightness of light varies depending on a position in the visual field space, and considers that, at the time of re-irradiation of the cut-off region, the change rate of the luminance of the turned-off LED light source 23 is changed according to a position of the cut-off region.

Figure 5:
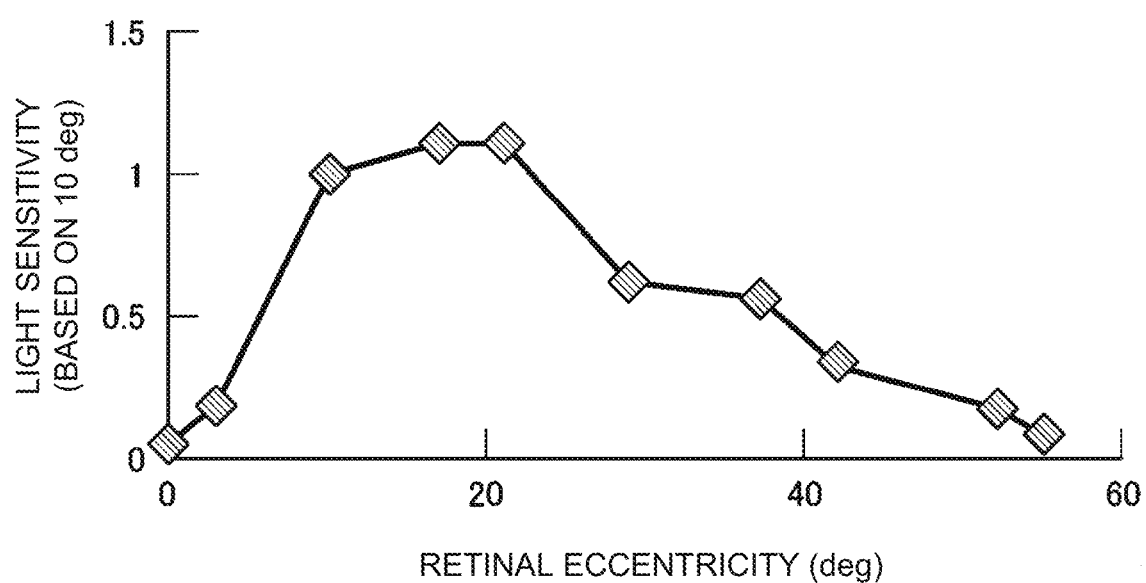
FIG. 5 is a view for describing characteristics of human light sensitivity.

Here, the characteristics of human light sensitivity will be described with reference to FIG. 5. In FIG. 5, the horizontal axis indicates retinal eccentricity (deg), which is an angle from a central depression of an eye, and the vertical axis indicates light sensitivity (which is specifically the visibility with respect to light in the dark and corresponds to the ease of perception of luminance changes). Regarding values of the light sensitivity indicated in the vertical axis, the value when the retinal eccentricity is 10 deg is used as the reference (that is, the value of the light sensitivity when the retinal eccentricity is 10 deg is set to "1"). As illustrated in FIG. 5, humans have visual characteristics in which the light sensitivity becomes highest in a region around the retinal eccentricity of 20 deg and the light sensitivity becomes lower as the distance from the region around the retinal eccentricity of 20 deg increases. Such visual characteristics are caused by the distribution density of the rod cells on the retina which respond to the intensity of light in the dark. Specifically, the distribution density of the rod cells on the retina is characterized in that the density of the rod cells is small around the central depression, the density of the rod cells becomes larger as the distance from the central depression increases to some extent, and the density of the rod cells becomes smaller as the distance from the central depression increases further.

Figure 6:
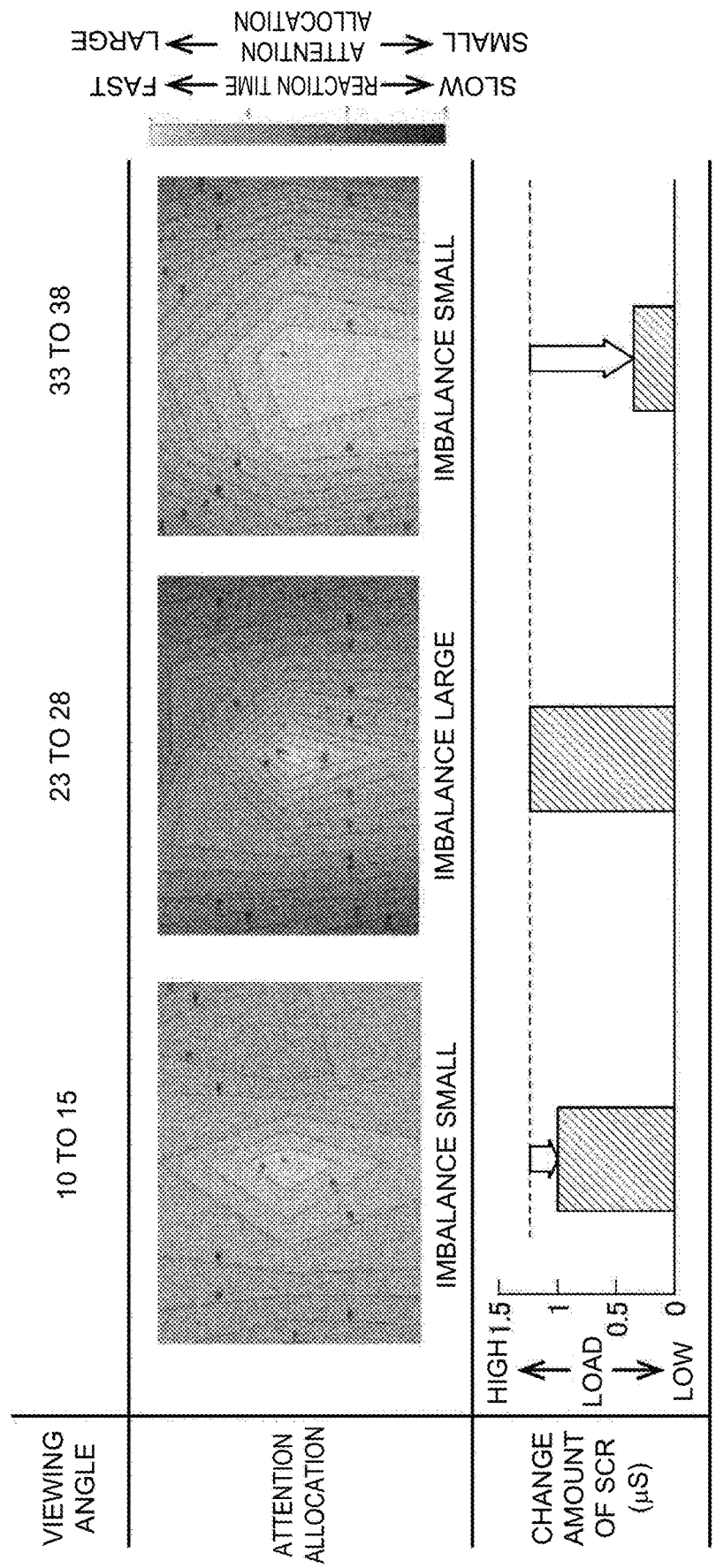
FIG. 6 is a view for describing, in the case where luminance of the LED light source is quickly changed at the time of re-irradiation of a cut-off region, differences in a load on a driver and an attention allocation due to a human viewing angle.

Next, differences in the load and the attention allocation due to a human viewing angle (corresponding to the retinal eccentricity) which are caused by the characteristics of the human light sensitivity described above will be described with reference to FIG. 6. Here, the load and the attention allocation are verified by quickly changing the luminance of the LED light source 23 at the time of re-irradiation of the cut-off region. The upper part of FIG. 6 illustrates viewing angles verified here, specifically, 10 to 15 deg, 23 to 28 deg, and 33 to 38 deg, the middle part of FIG. 6 illustrates a result of the attention allocation which is obtained in each of the verified viewing angles, and the lower part of FIG. 6 illustrates a result of a change amount (μS) in skin conductive resistance (SCR) corresponding to a resistance value changing according to hand sweating which is obtained in each of the verified viewing angles. The SCR is an index representing a degree of tension (corresponding to a load which a human feels) and is detected by a sweating sensor provided on a steering wheel.

The results of the attention allocation and the SCR are obtained in the case where, while a subject is executing a driving simulator using a display (the subject performs only a steering operation at a vehicle speed of about 100 km/h), an image according to the control of the LED light sources 23 at the time of re-irradiation of the cut-off region is presented on the display. Here, at the time of re-irradiation of the cut-off region, the luminance of the turned-off LED light source 23 is increased quickly. Specifically, a time until completion of turning on the turned-off LED light source 23 again, more specifically, a time during which the luminance of the turned-off LED light source 23 is increased until it reaches a desired luminance (hereinafter referred to as "luminance change time"), is set to 200 msec. Furthermore, the result of the attention allocation is obtained in a manner in which, during execution of the driving simulator, in the state where the subject pays attention to a fixation point presented at the center of the display, when a predetermined index is presented at a random position on the display, the reaction time of the subject with respect to the index (the color shade in FIG. 6 indicates the length of the reaction time) is measured. In the case where the reaction time with respect to the index varies depending on a position at which the index is presented (in particular, in the case where the reaction time at the position far from the center of the display is significantly delayed more than the reaction time around the center of the display), it corresponds to the fact that the imbalance in the attention allocation is large.

It is understood from FIG. 6 that, while the imbalance in the attention allocation is small in the viewing angles of 10 to 15 deg and 33 to 38 deg, the imbalance in the attention allocation is large in the viewing angle of 23 to 28 deg. Furthermore, it is understood that, while the change amount of the SCR is small (that is, the load is low) in the viewing angle of 33 to 38 deg, the change amount of the SCR is large (that is, the load is high) in the viewing angles of 10 to 15 deg and 23 to 28 deg. From this, it is understood that, at the time of re-irradiation of the cut-off region, if the luminance of the turned-off LED light source 23 is increased quickly, that is, if the luminance change time of the LED light source 23 is short, the load is large and/or the imbalance in the attention allocation is large in the region (viewing angle) where the human light sensitivity is high. In other words, it is understood that, in the region (viewing angle) where the human light sensitivity is low, even if the luminance change time of the LED light source 23 is short, the load is small and the imbalance in the attention allocation is small.

From above, in the present embodiment, in consideration of the human visual characteristics regarding the light sensitivity described above, at the time of re-irradiation of the cut-off region, the controller 30 controls the headlight 20 such that the change rate of the luminance of the turned-off LED light source 23 corresponding to the cut-off region is changed according to the position of the cut-off region, that is, such that the luminance change time of the LED light source 23 is changed according to the position of the cut-off region. Specifically, since the load on the driver or the imbalance in the attention allocation is less likely to occur in the cut-off region included in the region where the light sensitivity is low, the controller 30 relatively increases the change rate of the luminance of the LED light source 23 that re-irradiates this cut-off region, that is, relatively shortens the luminance change time of the LED light source 23, so that safety is secured by quick re-irradiation of the cut-off region. In contrast, since the load on the driver or the imbalance in the attention allocation is likely to occur in the cut-off region included in the region where the light sensitivity is high, the controller 30, in order to preferentially suppress this, relatively reduces the change rate of the luminance of the LED light source 23 that re-irradiates the cut-off region, that is, relatively lengthens the luminance change time.

Figure 7:
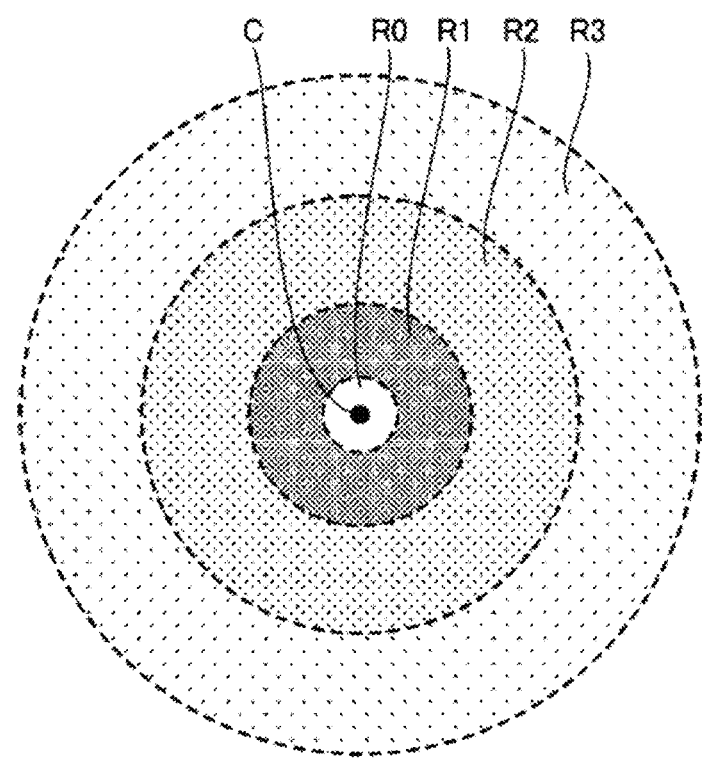
FIG. 7 is a view for describing a region used for changing a change rate of the luminance of the LED light source according to a position of the cut-off region in the embodiment of the present disclosure.

Next, a region used for changing the change rate of the luminance of the LED light source 23 according to a position of the cut-off region in the embodiment of the present disclosure will be described with reference to FIG. 7. In FIG. 7, reference numeral C is a position ahead of the own vehicle 1 which corresponds to a center position of a visual field of the driver. For example, the position C is a position directly in front of the vehicle-width-direction center of a driver seat. Furthermore, reference character R0 is a region ahead of the own vehicle 1 which includes the position C and corresponds to a center region of the visual field of the driver (for example, a discriminative visual field).

In the present embodiment, in the case where the irradiation region of the LED light source 23 that re-irradiates the cut-off region (corresponding to the cut-off region itself) is included in a region R1 outside of the region R0, the controller 30 changes the luminance of the LED light source 23 at a first change rate, which is relatively small, in other words, sets the luminance change time of the LED light source 23 to be relatively longer. Furthermore, in the case where the irradiation region of the LED light source 23 that re-irradiates the cut-off region is included in a region R2 further outside of the region R1, the controller 30 changes the luminance of the LED light source 23 at a second change rate, which is smaller than the first change rate, in other words, sets the luminance change time of the LED light source 23 to be longer than that of the region R1. Furthermore, in the case where the irradiation region of the LED light source 23 that re-irradiates the cut-off region is included in a region R3 further outside of the region R2, the controller 30 changes the luminance of the LED light source 23 at a third change rate, which is larger than the first change rate, in other words, sets the luminance change time of the LED light source 23 to be shorter than that of the region R1.

For example, the region R1 corresponds to a region where the viewing angle is about 5 to 10 deg, the region R2 corresponds to a region where the viewing angle is about 10 to 30 deg, and the region R3 corresponds to a region where the viewing angle is equal to or more than 30 deg. Furthermore, a region where the region R1 and the region R2 are combined corresponds to a "first region" in the present disclosure, and the region R3 corresponds to a "second region" in the present disclosure. In addition, the region R1 corresponds to a "third region" in the present disclosure, and the region R2 corresponds to a "fourth region" in the present disclosure. Although in the above example, the region where the region R1 and the region R2 are combined is used as the "first region" in the present disclosure, in another example, a region where at least a part of the region R0 is further combined with the region R1 and the region R2 may be used as the "first region" in the present disclosure.

Next, in the present embodiment, at the time of re-irradiation of the cut-off region, in order to effectively suppress the load on the driver or the imbalance in the attention allocation, the controller 30 gradually changes the luminance of the turned-off LED light source 23 based on the Weber-Fechner law (hereinafter also referred to as merely the "Fechner's law") to turn on the turned-off LED light source 23 again. This Fechner's law is a law that the quantity of human psychological sensation is perceived, rather than by the stimulus intensity, in proportion to its logarithm. Specifically, in the present embodiment, the controller 30 gradually increases the luminance of the LED light source 23 based on Fechner's law such that the change in the luminance perceived by a human becomes constant, that is, the quantity of sensation changes in a constant manner.

Figure 8:
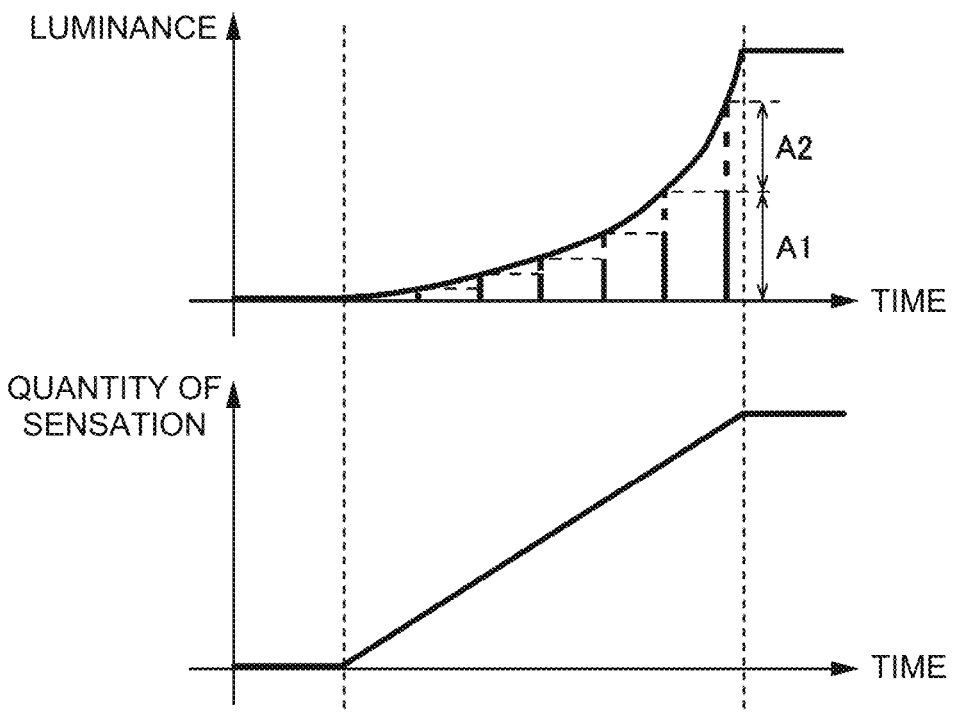
FIG. 8 is a view for describing control of the headlight based on the Weber-Fechner law according to the embodiment of the present disclosure.

FIG. 8 is a view for describing control of the headlight 20 based on the Weber-Fechner law according to the embodiment of the present disclosure. The upper view of FIG. 8 illustrates a change in the luminance of the LED light source 23 which is caused by the control according to the present embodiment, and the lower view of FIG. 8 illustrates a change amount (quantity of sensation) of the luminance perceived by a human which is caused by the control according to the present embodiment. As illustrated in the upper view of FIG. 8, in the present embodiment, by means of, as the Fechner's law, a condition of making constant a ratio of a change amount A2 (indicated by the broken line) of the luminance of the LED light source 23 after a predetermined time (unit time) to luminance A1 (indicated by the thick solid line) of the LED light source 23 before the predetermined time (unit time), the controller 30 gradually increases the luminance of the LED light source 23 at the time of re-irradiation of the cut-off region. That is, the controller 30 changes the luminance of the LED light source 23 based on a formula "change amount A2 of luminance/luminance A1 before change=a (constant)" (hereinafter referred to as merely the "Fechner's formula"). In this Fechner's formula, "a" is a fixed value set as appropriate through an experiment, a simulation, or the like.

As illustrated in the lower view of FIG. 8, when the luminance of the LED light source 23 is changed based on the Fechner's law as in the present embodiment, it is understood that the quantity of human sensation changes linearly. Thus, according to the present embodiment, the cut-off region which has been dark suddenly becomes brighter, so that it is possible to appropriately suppress application of the load due to glare, blinking, or the like to the driver. Furthermore, according to the present embodiment, it is possible to suppress the situation where attention is directed to the cut-off region which has suddenly become brighter and attention is less likely to be directed to other regions, that is, it is possible to appropriately suppress the imbalance in the attention allocation.

Figure 9:
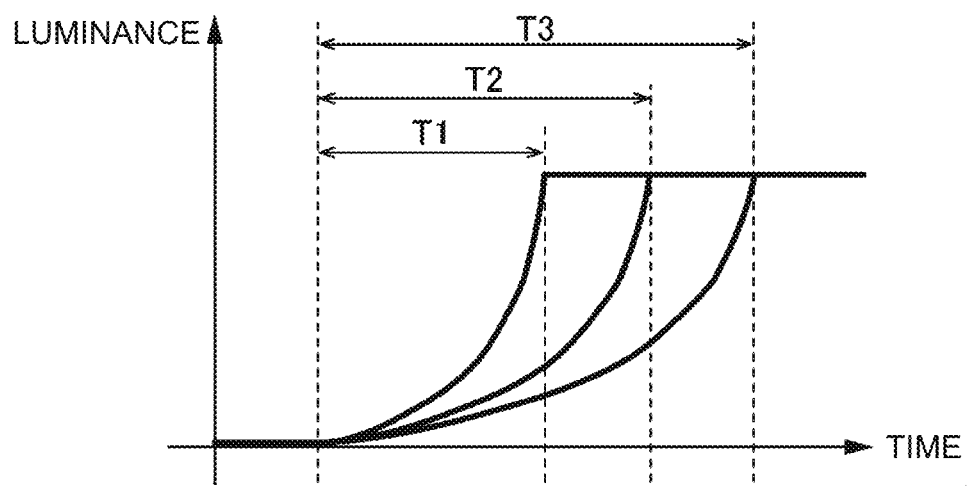
FIG. 9 is a view for describing luminance change time used in the case where the control based on the Weber-Fechner law is performed in the embodiment of the present disclosure.

Next, the luminance change time used in the regions R1 to R3 (see FIG. 7) in the case where the control based on the Weber-Fechner law is performed in the embodiment of the present disclosure will be described with reference to FIG. 9. The value of "a" in the Fechner's formula described above affects the change rate (change speed) of the luminance of the LED light source 23. Accordingly, adjusting the value of "a" can adjust the change rate of the luminance of the LED light source 23 (specifically, increasing the value of "a" increases the change rate of the luminance). That is, setting the value of "a" as appropriate can adjust the luminance change time of the LED light source 23 described above. Accordingly, the controller 30 performs, with respect to each of the regions R1 to R3, the control for gradually increasing the luminance of the LED light source 23 at the time of re-irradiation of the cut-off region based on the Fechner's formula in which the value of "a" which realizes a desired luminance change time is used. In the present embodiment, the controller 30 uses time T2, which is relatively long, as the luminance change time in the region R1, uses time T3, which is longer than the time T2, as the luminance change time in the region R2, and uses time T1, which is shorter than the time T2, as the luminance change time in region R3.

According to the results of an experiment, a simulation, and the like conducted by the inventors of the present application, it has been understood that, if the luminance of the turned-off LED light source 23 is changed into a desired luminance in 0.2 seconds or more, it is possible to appropriately suppress the load on the driver or the imbalance in the attention allocation at the time of re-irradiation of the cut-off region. On the other hand, it has been understood that, in order to quickly secure the viewability of the cut-off region through turning on the turned-off LED light source 23 again, that is, in order to secure safety, it is desirable to change the luminance of the turned-off LED light source 23 into a desired luminance within 0.6 seconds. In conclusion, it can be said that it is desirable to set the luminance change time of the LED light source 23 in a range of 0.2 seconds to 0.6 seconds. Accordingly, in the present embodiment, for example, the luminance change time T2 in the region R1 is set to 300 msec, the luminance change time T3 in the region R2 is set to 400 msec, and the luminance change time T1 in the region R3 is set to 200 msec. Each of the regions R1, R2, and R3 is not limited to the use of the fixed luminance change time T2, T3, or T1, and the luminance change time may be changed in a continuous or stepwise manner according to a position corresponding to the viewing angle.

The control of the luminance of the LED light source 23 at the time of re-irradiation of the cut-off region according to the present embodiment described above can be executed by using luminance of reflection light from an object irradiated by the LED light source 23. Accordingly, in an embodiment, the controller 30 detects, by means of the camera 11, the luminance of the reflection light from the object irradiated by the LED light source 23 and, based on this detected luminance, performs the control for gradually increasing the luminance of the LED light source 23 at the time of re-irradiation of the cut-off region. Instead of using the luminance detected by the camera 11, a representative value of the luminance of the reflection light from the object irradiated by the LED light source 23 may be defined in advance, and this luminance value may be used as a fixed value to perform the control for gradually increasing the luminance of the LED light source 23 at the time of re-irradiation of the cut-off region.

Furthermore, although in the embodiment described above, the control for gradually increasing the luminance of the turned-off LED light source 23 is performed at the time of re-irradiation of the cut-off region based on the Fechner's law, in another example, control for linearly gradually increasing the luminance of the turned-off LED light source 23 may be performed at the time of re-irradiation of the cut-off region. That is, it is only necessary to gradually change the luminance of the turned-off LED light source 23, and the aspect of the change is not limited.

Furthermore, the control of the luminance at the time of re-irradiation of the cut-off region according to the present embodiment described above is not limited to the use in the LED light source 23 of the high beam unit 21*b* and may be used in the LED light source 23 of the low beam unit 21*a*.

[Operations and Effects]

Figure 10:
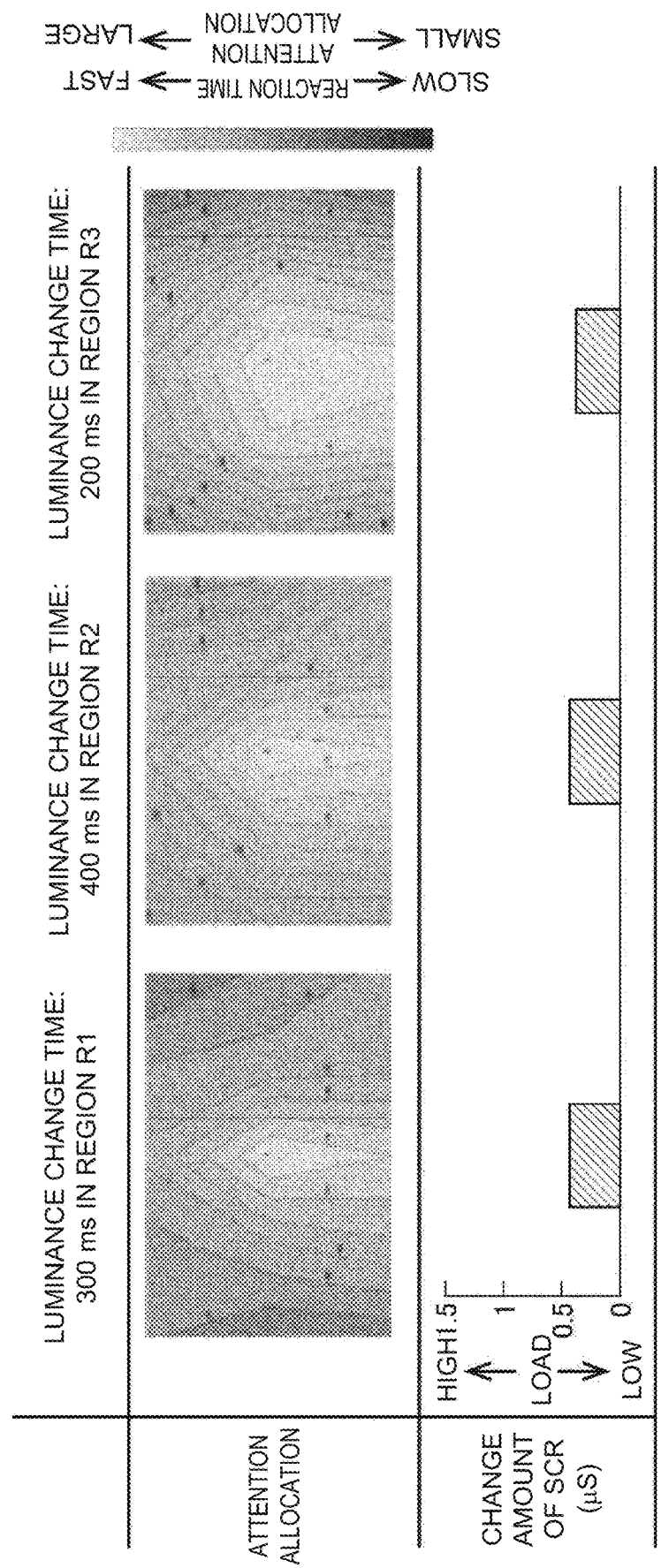
FIG. 10 is a view for describing operations and effects according to the embodiment of the present disclosure.

Next, operations and effects of the headlight control system 100 according to the embodiment of the present disclosure will be described with reference to FIG. 10. The left part of FIG. 10 illustrates results of the attention allocation and the SCR when, at the time of re-irradiation of the cut-off region included in the region R1 (for example, the region corresponding to the viewing angle of 10 to 15 deg), the luminance change time (T2) is set to 300 msec and the luminance of the LED light source 23 is changed. The center part of FIG. 10 illustrates results of the attention allocation and the SCR when, at the time of re-irradiation of the cut-off region included in the region R2 (for example, the region corresponding to the viewing angle of 23 to 28 deg), the luminance change time (T3) is set to 400 msec and the luminance of the LED light source 23 is changed. The right part of FIG. 10 illustrates results of the attention allocation and the SCR when, at the time of re-irradiation of the cut-off region included in the region R3 (for example, the region corresponding to the viewing angle of 33 to 38 deg), the luminance change time (T1) is set to 200 msec and the luminance of the LED light source 23 is changed. Such results illustrated in FIG. 10 are obtained by performing an experiment (driving simulator) similar to that of FIG. 6. Accordingly, detailed description of the experimental conditions will be omitted here.

As illustrated in FIG. 10, according to the present embodiment, it is understood that, in all of the regions R1, R2, and R3, the imbalance in the attention allocation is small and the change amount of the SCR is small (that is, the load is low). That is, according to the present embodiment, based on the human visual characteristics regarding the light sensitivity, the headlight 20 is controlled such that, at the time of re-irradiation of the cut-off region, the change rate of the luminance of the turned-off LED light source 23 is changed according to the position of the cut-off region (the irradiation region of the LED light source 23), so that it is possible to appropriately achieve both suppression of the load on the driver or the imbalance in the attention allocation and securing of safety by quick re-irradiation of the cut-off region. Specifically, in the regions R1 and R2 where the light sensitivity is high, the change rate of the luminance of the turned-off LED light source 23 is relatively reduced, so that it is possible to suppress the load on the driver or the imbalance in the attention allocation. In the region R3 where the light sensitivity is low, the change rate of the luminance of the turned-off LED light source 23 is relatively increased, so that it is possible to secure safety by quick re-irradiation of the cut-off region.

What is claimed is:

1. A method, comprising:
controlling a headlight including a plurality of LED light sources that irradiate a plurality of regions ahead of a vehicle such that, in response to it being detected by a target object detection device that a predetermined target object is present, of the plurality of LED light sources of the headlight, turn off an LED light source of the plurality of LED light sources irradiating a region where the predetermined target object is present, and in response to it being detected by the target object detection device that the target object is not present in the region, turn on the turned-off LED light source;
controlling the headlight such that, in response to it being detected by the target object detection device that the target object is not present and the turned-off LED light source is turned on, a change rate of luminance of the LED light source is changed according to a position of an irradiation region of the LED light source; and controlling the headlight such that, in response to the position of the irradiation region of the LED light source being included in a center region of a visual field of a driver or in a first region corresponding to a vicinity region outside of the center region, the luminance of the LED light source is changed at a smaller change rate than when the position of the irradiation region of the LED light source is included in a second region outside of the first region.

2. A headlight control system, comprising:
a headlight including a plurality of LED light sources that irradiate a plurality of regions ahead of a vehicle;
a target object detection device that detects a predetermined target object present ahead of the vehicle; and
a controller configured to control the headlight such that, in response to it being detected by the target object detection device that the predetermined target object is present, of the plurality of LED light sources of the headlight, turn off an LED light source of the plurality of LED light sources irradiating a region where the predetermined target object is present, and in response to it being detected by the target object detection device that the target object is not present in the region, turn on the turned-off LED light source,
control the headlight such that, in response to it being detected by the target object detection device that the target object is not present and the turned-off LED light source is turned on, a change rate of luminance of the LED light source is changed according to a position of an irradiation region of the LED light source, and
control the headlight such that, in response to the position of the irradiation region of the LED light source being included in a center region of a visual field of a driver or in a first region corresponding to a vicinity region outside of the center region, the luminance of the LED light source is changed at a smaller change rate than when the position of the irradiation region of the LED light source is included in a second region outside of the first region.

3. The headlight control system according to claim 2, wherein
the first region includes a third region located on an inner side in the region and a fourth region located outside of the third region, and
the controller is configured to control the headlight such that, in response to the position of the irradiation region of the LED light source being included in the fourth region, the luminance of the LED light source is changed at a smaller change rate than when the position of the irradiation region of the LED light source is included in the third region.

4. The headlight control system according to claim 3, wherein the controller is configured to set the change rate of the luminance of the LED light source based on the Weber-Fechner law.

5. The headlight control system according to claim 4, wherein the controller is configured to control the headlight such that, between 0.2 seconds and 0.6 seconds, the luminance of the turned-off LED light source is changed and turning-on of the LED light source is completed.

6. The headlight control system according to claim 2, wherein the controller is configured to set the change rate of the luminance of the LED light source based on the Weber-Fechner law.

7. The headlight control system according to claim 2, wherein the controller is configured to control the headlight such that, between 0.2 seconds and 0.6 seconds, the luminance of the turned-off LED light source is changed and turning-on of the LED light source is completed.

8. The headlight control system according to claim 2, wherein the controller is configured to set the change rate of the luminance of the LED light source based on the Weber-Fechner law.

9. The headlight control system according to claim 2, wherein the controller is configured to control the headlight such that, between 0.2 seconds and 0.6 seconds, the luminance of the turned-off LED light source is changed and turning-on of the LED light source is completed.

10. The headlight control system according to claim 3, wherein the controller is configured to control the headlight such that, between 0.2 seconds and 0.6 seconds, the luminance of the turned-off LED light source is changed and turning-on of the LED light source is completed.

11. The headlight control system according to claim 6, wherein the controller is configured to control the headlight such that, between 0.2 seconds and 0.6 seconds, the luminance of the turned-off LED light source is changed and turning-on of the LED light source is completed.

12. The headlight control system according to claim 8, wherein the controller is configured to control the headlight such that, between 0.2 seconds and 0.6 seconds, the luminance of the turned-off LED light source is changed and turning-on of the LED light source is completed.

13. The headlight control system according to claim 2, further comprising:
a high beam unit in the headlight, wherein the controller is configured to
turn on a plurality of LED light sources of the high beam unit such that an area ahead of the vehicle is irradiated in response to the predetermined target object not being present ahead of the vehicle, wherein the irradiation ranges are formed by the plurality of LED light sources of the high beam unit, and
turn off the plurality of LED light sources of the high beam unit in response to the plurality of LED light sources irradiating a region including the predetermined target object traveling in a same direction ahead of the vehicle.

14. The headlight control system according to claim 11, further comprising:
a high beam unit in the headlight, wherein the controller is configured to
turn on a plurality of LED light sources of the high beam unit such that an area ahead of the vehicle is irradiated in response to the predetermined target object not being present ahead of the vehicle, wherein the irradiation ranges are formed by the plurality of LED light sources of the high beam unit, and
turn off the plurality of LED light sources of the high beam unit in response to the plurality of LED light sources irradiating a region including the predetermined target object traveling in an opposite direction ahead of the vehicle.

15. The headlight control system according to claim 2, wherein the first region is a region where the viewing angle is from 5 degrees to 30 degrees, and the second region is a region where the viewing angle is equal to or greater than 30 degrees.

16. The headlight control system according to claim 3, wherein the first region is a region where the viewing angle is from 5 degrees to 30 degrees, the second region is a region where the viewing angle is equal to or greater than 30 degrees, the third region is a region where the viewing angle is from 5 degrees to 10 degrees, and the fourth region is a region where the viewing angle is from 10 degrees to 30 degrees.

17. A vehicle, comprising:
a headlight control system including
 a headlight including a plurality of LED light sources that irradiate a plurality of regions ahead of a vehicle;
 a target object detection device that detects a predetermined target object present ahead of the vehicle; and
 a controller configured to control the headlight such that, in response to it being detected by the target object detection device that the predetermined target object is present, of the plurality of LED light sources of the headlight, turn off an LED light source of the plurality of LED light sources irradiating a region where the predetermined target object is present, and in response to it being detected by the target object detection device that the target object is not present in the region, turn on the turned-off LED light source,
 control the headlight such that, in response to it being detected by the target object detection device that the target object is not present and the turned-off LED light source is turned on, a change rate of luminance of the LED light source is changed according to a position of an irradiation region of the LED light source, and
 control the headlight such that, in response to the position of the irradiation region of the LED light source being included in a center region of a visual field of a driver or in a first region corresponding to a vicinity region outside of the center region, the luminance of the LED light source is changed at a smaller change rate than when the position of the irradiation region of the LED light source is included in a second region outside of the first region.

18. The vehicle of claim 17, wherein
the first region includes a third region located on an inner side in the region and a fourth region located outside of the third region, and
the controller is configured to control the headlight such that, in response to the position of the irradiation region of the LED light source being included in the fourth region, the luminance of the LED light source is changed at a smaller change rate than when the position of the irradiation region of the LED light source is included in the third region.

* * * * *